United States Patent
Kordt et al.

(10) Patent No.: US 11,686,533 B2
(45) Date of Patent: Jun. 27, 2023

(54) HEAT STORE WITH RAILS AS HEAT-STORAGE BODIES

(71) Applicant: Lumenion GmbH, Berlin (DE)

(72) Inventors: Peter Kordt, Berlin (DE); Herbert Piereder, Vienna (AT)

(73) Assignee: Lumenion GmbH, Berlin (DE)

( * ) Notice: Subject to any disclaimer, the term of this patent is extended or adjusted under 35 U.S.C. 154(b) by 0 days.

(21) Appl. No.: 17/963,603

(22) Filed: Oct. 11, 2022

(65) Prior Publication Data

US 2023/0029622 A1 Feb. 2, 2023

Related U.S. Application Data

(63) Continuation of application No. PCT/EP2022/050001, filed on Jan. 1, 2022.

(30) Foreign Application Priority Data

Jan. 22, 2021 (EP) .................................... 21153117

(51) Int. Cl.
  *F28D 17/00* (2006.01)
  *F28D 20/02* (2006.01)
(52) U.S. Cl.
  CPC .................... *F28D 20/02* (2013.01)
(58) Field of Classification Search
  CPC ...................................................... F28D 20/02
  USPC .......................................................... 165/10
  See application file for complete search history.

(56) References Cited

U.S. PATENT DOCUMENTS

| 2020/0011207 A1 | 1/2020 | Zwinkels |
| 2020/0232345 A1 | 7/2020 | Zwinkels |

FOREIGN PATENT DOCUMENTS

| DE | 1005673 B | 4/1957 |
| DE | 1236761 A1 | 5/1993 |
| DE | 102011007335 A1 | 10/2012 |
| DE | 102011118106 A1 | 5/2013 |
| EP | 3139107 B1 | 3/2017 |
| EP | 3379040 B1 | 9/2018 |
| EP | 3633303 A1 | 4/2020 |
| EP | 3647677 A1 | 5/2020 |
| JP | 3471404 B2 * | 12/2003 |
| JP | 2005127536 A * | 5/2005 |
| KR | 101775771 B1 | 9/2017 |
| WO | 2019025182 A1 | 2/2019 |

OTHER PUBLICATIONS

International Search Report and Written Opinion for International Patent Application No. PCT/EP2022/050001 with English translation, dated Feb. 7, 2022, 16 pages.

* cited by examiner

*Primary Examiner* — Davis D Hwu
(74) *Attorney, Agent, or Firm* — LaBatt, LLC

(57) ABSTRACT

A heat store comprises heat-storage bodies for storing thermal energy, a housing, in which the heat-storage bodies are accommodated; and at least one line for a heat-transfer fluid, in order to feed thermal energy to the heat-storage bodies and/or carry it away from the heat-storage bodies. Each of the heat-storage bodies comprises a metal rail of an elongated form, the cross-section of which has a web between widened ends.

20 Claims, 4 Drawing Sheets

HEAT STORE WITH RAILS AS HEAT-STORAGE BODIES

REFERENCE TO RELATED APPLICATIONS

The current application is a continuation of International Patent Application No. PCT/EP2022/050001, filed on 1 Jan. 2022, which claims the benefit of European Patent Application No. 21153117.3, filed on 22 Jan. 2021, each of which is hereby incorporated by reference.

TECHNICAL FIELD

The present disclosure relates to a heat store and a method for operating a heat store.

BACKGROUND

As a correlate of a climate-friendly energy supply with reduced $CO_2$ emissions, heat storage systems are increasing in importance. For example, electrical energy generated by photovoltaic or wind power plants during sunny or windy periods can be converted into heat and stored in a heat store as thermal energy. The energy can be extracted at later points in time, for example for heating purposes or for the generation of electrical energy by means of turbine-generator units, as described by the Applicant in European patent EP 3 379 040 B1.

A generic heat store comprises heat-storage bodies for storing thermal energy, a housing in which the heat-storage bodies are received, and at least one conduit for a heat-transfer fluid in order to conduct thermal energy to and/or away from the heat-storage bodies. Accordingly, in a generic method for operating a heat store in which heat-storage bodies for storing thermal energy are received in a housing, thermal energy is conducted to and/or away from the heat-storage bodies with a heat-transfer fluid.

In general, heat-storage bodies should, among other things, have a thermal capacity that is as large as possible, be able to be heated to temperatures that are as high as possible for a high energy conversion efficiency and provide a large contact surface for a rapid heat exchange. A high number of cycles of heating and cooling phases should also be possible without damaging or wearing out the heat store. Simple heat stores such as those described in, e.g., DE 10 2011 007 335 A1 utilize concrete blocks as heat-storage bodies. In order to avoid damages, such a heat store is, however, ideally only operated at moderate temperatures and temperature changes. Moreover, a block shape only provides a small contact surface and thus a relatively slow heat transfer. Heat stores that utilize stones, granular material or similar porous materials as heat-storage bodies provide a larger contact surface. However, high temperatures or numerous heating cycles can lead to fractures as a result of which the granular material caves in and an efficient heat transfer to, e.g., a flowing gas is not possible.

When metallic heat-storage bodies, for example made of steel, are used, on the other hand, it is possible to achieve higher temperatures and thus a higher energy conversion efficiency with high long-term stability. Such a generic heat store is described by the Applicant in European patent EP 3 139 107 B1. A plurality of steel plates are used as metallic heat-storage bodies here, which are stacked on top of one another and between which heat-exchanging pipes are arranged. If the heat store is operated over a large temperature range, however, thermal expansion can lead to problems, especially when heat-exchanging pipes with a different temperature from the steel plates are in direct contact with the steel plates. In another approach, in particular metal bars have been described as heat-storage bodies by the Applicant, as published in WO 2019/025182 A1, EP 3 633 303 A1 and EP 3 647 677 A1. The metal bars can be arranged vertically or held horizontally via suitable supports so as to be spaced apart from one another. While the aforementioned general objectives have already been achieved to a large extent, it continues to be desirable to realize a storage capacity that is as large as possible as well as the possibility of a rapid charging and discharging with a simple design. DE 1005673 B describes a heat exchanger in which iron rods bent into a hairpin shape are suspended in a channel as heat-storage bodies. A heat-emitting medium and medium to be heated are alternately passed through the channel so that the iron rods bent into a hairpin shape absorb and release heat, respectively. The hairpin shape makes it possible to suspend the iron bars, which in turn facilitates a vibration of the iron bars for cleaning.

SUMMARY

It can be considered an object of the invention to provide a heat store and a method which enable a particularly efficient heat storage with a simple design.

This object is achieved by the heat store with the features of claim 1 and by the method with the features of claim 14.

In the heat store of the aforementioned type, according to the invention, each of the heat-storage bodies includes a metallic rail with an elongated shape, the cross-section of which comprises a web between wider ends.

Likewise, in the method of the aforementioned type, according to the invention, each of the heat-storage bodies includes a metallic rail with an elongated shape, the cross-section of which comprises a web between wider ends.

As the web is thinner than the wider ends, a free space with a relatively large contact surface is provided for a heat exchange. This cross-sectional shape, which can also be described as an I-beam shape, yields a high mechanical stability. It also enables a stable footing, in particular a stacking without the risk of a cave-in should rails be arranged, e.g., imprecisely. The wider ends, i.e. one or both ends, provide a relatively high mass and thus a large thermal capacity. In comparison with the heat-storage bodies described in the introduction, a large thermal storage capacity with a large surface area and simultaneously high stability is achieved with the invention without the need for complex or cost-intensive configurations.

OPTIONAL EMBODIMENTS

Variants of the heat store according to the invention and of the method according to the invention are the object of the dependent claims and are explained in the following description.

Shape of the Rails

One of the wider ends in cross-section can optionally form a base with a flat bottom. The base can stand on a ground and provides a reliable footing due to its flat bottom side. It is possible to stack the rails safely by arranging the base of one rail on a rail underneath.

Additionally or alternatively, one of the wider ends in cross-section can form a rail head. The rail head can be rounded and be directly joined to the web. A width of the rail head is greater than a width of the web, which can also be referred to as a waisted middle area. If the other wider end forms a base, then the width of the rail head is optionally smaller than a width of the base. A relatively large mass and thus a large heat storage capacity is provided by means of the rail head. A mass of the rail head can constitute, for example, at least 30% or at least 40% of a total mass of the rail. This means that, in the cross-section of the rail (perpendicularly to the longitudinal axis of the rail), a cross-sectional area of the rail head is at least 30% or at least 40% of a cross-sectional area of the rail. The optional rounding or curvature of the rail head relates to a side of the rail head that lies opposite the web and, in cases where rails are stacked one on top of the other, prevents an excessively large contact surface with the flat bottom side of an adjacent rail. The overall arrangement of a plurality of rails with curved rail heads thereby yields a larger surface area and thus a more rapid heat exchange to a heat-transfer fluid.

Railway rails/train track rails as manufactured for trains or other railway vehicles are a suitable example of rails. Railway rails combine the aforementioned advantages and are typically made of a suitable steel or a steel alloy that allows a heat storage operation at high temperatures of, for example, over 600° C. without a concomitant rapid material fatigue.

Arrangement of the Rails

At least some of the rails can be arranged next to each other, a rigid mechanical connection between the rails not being required. Thermal expansions of the rails thus do not lead to fractures or excessive stresses because the rails are able to expand or contract thermally relative to one another when temperature gradients arise within the heat store.

In particular, the rails in the housing can be stacked on top of one another in a plurality of tiers or layers. The rails of one layer can rest directly on the rails of a layer underneath. Rails belonging to the same layer can be arranged essentially parallel to one another. This can include rails arranged so as to be exactly parallel to one another, or rails arranged so that angles between the longitudinal axes of the rails can be up to 10° or up to 15°. The rails of a directly adjacent layer can be arranged transversely, in particular perpendicularly, thereto so that one rail lies on a plurality of rails underneath it. This ensures a reliable footing without a risk of rails of an upper layer accidentally falling between the rails of a layer underneath.

All rails can stand on their respective bases. The bases in the lowermost layer of rails thus stand on a substrate while the bases of the remaining layers rest on the rails underneath them. Alternatively, some rails can also be arranged so as to be rotated so that their base points sideways or upwards and their rail head potentially points downwards. In particular, adjacent rails can stand alternately on their base or on their rail head; i.e. rails within the same layer are alternately oriented with their base or head facing downwards. This allows a further rail to be received in a free space between two rails standing on their respective bases so that a higher thermal storage capacity is provided in the same space and the surfaces of the rails simultaneously remain accessible for a heat-transfer fluid.

The described variants in which rails are stacked on top of one another can also be modified so that the rails do not touch each other directly but are rather spaced apart by, e.g., (metallic) separator plates or perforated plates.

In principle, the rails can alternatively be arranged upright, whereby their longitudinal axes are vertical and the described cross-section forms the base surface of the respective rails. The aforementioned advantages are also achieved in this embodiment; in particular, the described shape provides a sufficient contact surface area for a rapid heat exchange and simultaneously high mechanical stability. If the rails are placed in direct contact with one another, it is possible to provide a large thermal storage capacity as well as a large surface area for the heat exchange within a confined space. In comparison with, e.g., elongated heat-storage bodies with a circular or square cross-section, the shapes according to the invention provide a larger surface area with the same cross-sectional surface area/thermal storage capacity. Moreover, in cases of a direct contact between adjacent rails, an accessibility to a large part of the rail surface for a heat-transfer fluid is preserved, in contrast to, e.g., bars with a square cross-section with which a large portion of surface area is no longer accessible for a heat-transfer fluid due to a flush contact.

Heat-Transfer Fluid and Heat Source

In principle, the heat-transfer fluid can be any gas or gas mixture, a vapour or any liquid, e.g., water or a thermal oil. A gas mixture can in particular be ambient air or a shielding gas, the moisture and/or oxygen content of which has been reduced, e.g., for the prevention of corrosion. In variants of the invention, the heat-transfer fluid is utilized both to heat the heat-storage bodies as well as (at a different point in time) to extract heat from the heat-storage bodies. In other variants of the invention, the heat-transfer fluid is utilized solely to heat the heat-storage bodies or solely to extract heat from the heat-storage bodies. In these variants, a second heat-transfer fluid can be conducted separately from the aforementioned heat-transfer fluid, wherein one of the heat-transfer fluids is utilized solely for supplying heat and the other heat-transfer fluid is utilized solely for removing heat. The two heat-transfer fluids can be the same or different fluids. As described in greater detail later on, it is also possible for a heat supply to occur by means of heating elements in the housing, whereby a single heat-transfer fluid for heat extraction is sufficient.

The heat-transfer fluid can be received in empty spaces formed between the bases, heads and webs of adjacent rails. It can flow directly along the rails and thus touch the rails directly.

If two separately conducted heat-transfer fluids are utilized for conducting heat to the heat-storage bodies and for conducting heat away from the heat-storage bodies, then one of the heat-transfer fluids can be conducted in pipe conduits between the rails while the other heat-transfer fluid is conducted either in other pipe conduits between the rails or freely along the rails (i.e. directly touching the rails). Pipe conduits can be pressed or welded onto the rails in order to provide a better thermal contact.

The conduit for a heat-transfer fluid mentioned in the introduction can be a conduit that leads to the housing, the heat-transfer fluid flowing freely through the housing. Alternatively, the conduit can include pipes inside the housing so that the heat-transfer fluid only flows through the pipes as opposed to through remaining free spaces in the housing. The conduit can be understood as a conduit system, which can also comprise junctions into a plurality of pipes that run next to one another. The conduit can also form a circuit in which the heat-transfer fluid circulates, for example by means of one or more pumps. The circuit can either run entirely inside the housing or partly inside and partly outside the housing. A heat exchanger, which can in particular be located outside the housing, can be coupled to the conduit in order to transfer heat to and/or extract heat from the heat-transfer fluid. The heat exchanger can provide, e.g., a heat exchange to another fluid or fluid circuit. In particular, waste heat from another system can be introduced via the heat exchanger, for example waste heat from a steel or power plant, the heat of an exhaust gas from a combustion process or heat released by an exothermic chemical reaction.

The heat store can optionally also comprise electric heating elements by means of which electrical energy is converted into thermal energy, which is then transferred to the heat-storage bodies where it is stored. The heating elements can be arranged in a circuit of the heat-transfer fluid so that heat from the heating elements is transferred to the rails via the heat-transfer fluid. Alternatively, the electric heating elements can also be arranged between adjacent rails. Suitable empty spaces for the heating elements are formed between the rails in cross-section by the web and the two thicker ends of a rail as well as by a peripheral section of at least one adjacent rail. The heating elements can in principle be of any design; for example, they can generate heat as a result of their electrical resistance.

General Features

A housing can basically be understood as walls of any shape that surround the heat-storage bodies. The housing can comprise thermal insulation in order to reduce a heat loss from the heat-storage bodies to an environment outside the housing. In some embodiments, the housing constitutes the boundaries for the heat-transfer fluid. If the heat-transfer fluid is in gaseous or vaporous form, the housing can be made, with the exception of fluid ports, gas-tight. The fluid ports can be connected to the conduit for the heat-transfer fluid in order to convey the heat-transfer fluid through the housing. In principle, the housing can also be filled with a heat-transfer fluid in the form of a liquid, wherein the rails are submerged in the liquid. In other embodiments, walls of the housing do not come into direct contact with the heat-transfer fluid; instead, the conduit for the heat-transfer fluid comprises a plurality of pipes which run through the housing along the rails.

The elongated shape of the rails can be understood to mean that a longitudinal dimension of a rail is at least 5 times or at least 10 times greater than a width and/or height of the rail, wherein the width and height are to be understood as perpendicular to the longitudinal direction. The cross-section is perpendicular to the longitudinal direction. The cross-sectional shape of the rail can be constant along the entirety of its longitudinal direction. In principle, the rail can also be curved along its longitudinal direction.

The characteristics of the invention that have been described as additional apparatus features also yield, when implemented as intended, variants of the method according to the invention. Conversely, the heat store can also be configured to carry out the described method variants.

BRIEF DESCRIPTION OF THE FIGURES

Further effects and features of the invention are described in the following with reference to the attached schematic figures.

DETAILED DESCRIPTION OF EXAMPLE EMBODIMENTS

Different example embodiments are described in the following with reference to the figures. As a rule, similar elements and elements that function in a similar manner are designated by the same reference signs.

Figure 1:
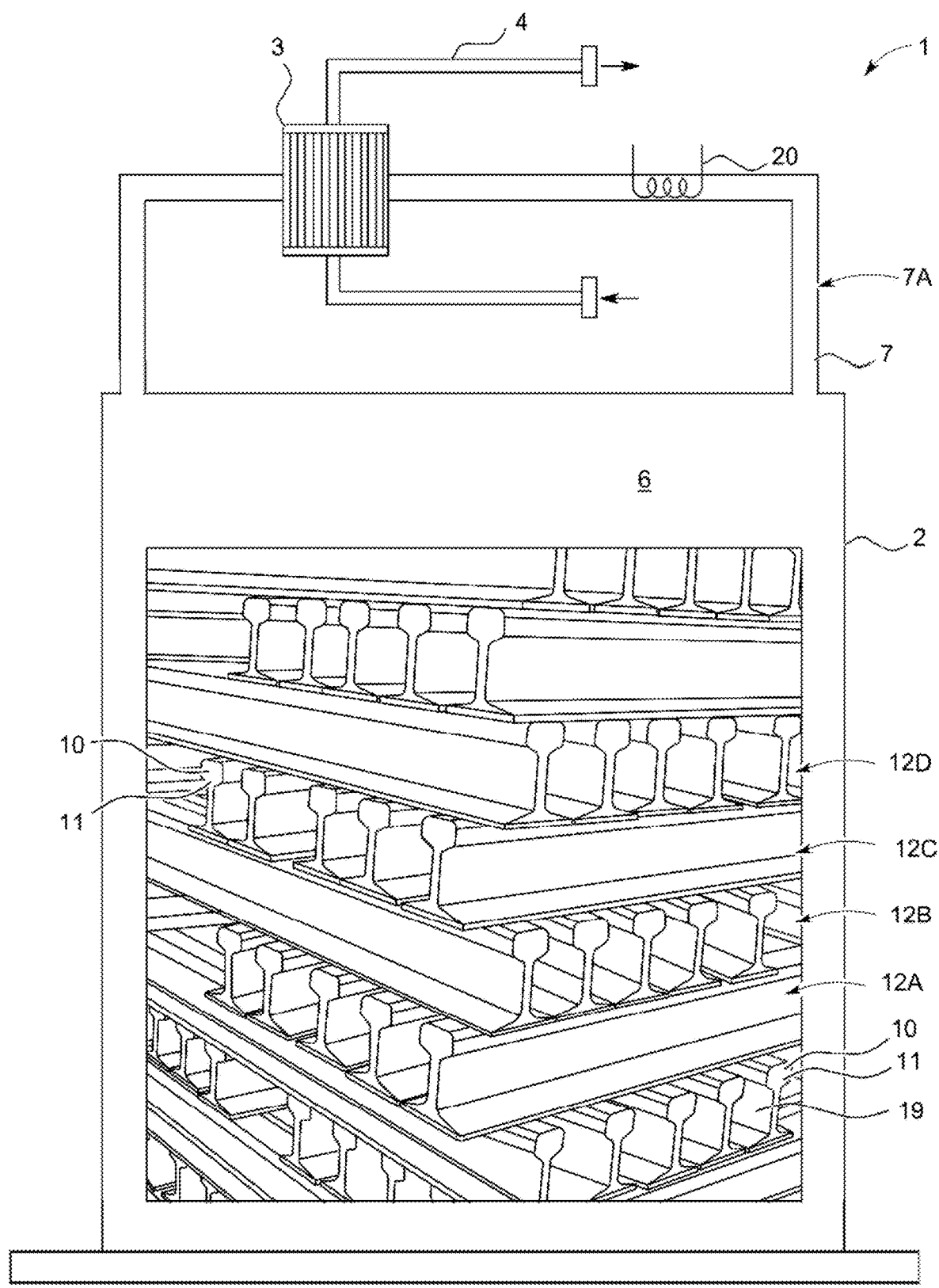
FIG. 1 is a schematic illustration of an example embodiment of a heat store of the invention.
Figure 2:
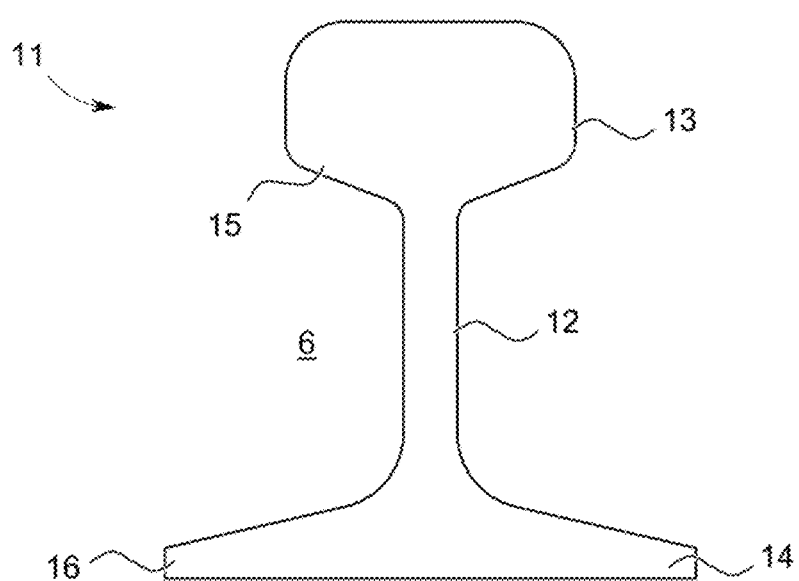
FIG. 2 shows a cross-section of a rail of example embodiments of a heat store of the invention.

Example Embodiment of FIGS. 1 and 2

An example embodiment of a heat store according to the invention is described in the following with reference to FIGS. 1 and 2. FIG. 1 shows schematically a heat store 1 with a plurality of rails 11 as heat-storage bodies 10. FIG. 2 shows a cross-section of one of the rails 11.

The heat store 1 comprises a housing 2 in which a plurality of rails 11 are received as heat-storage bodies 10. A conduit 7 for heat-transfer fluid 6 leads into the housing 2. In the illustrated example, the conduit 7 leads into the housing 2 so that the heat-transfer fluid 6 is able to flow freely through the housing 2 along the rails 11. A circuit 7A is formed with the conduit 7 for the heat-transfer fluid 6 so that it can circulate along the heat-storage bodies 10, for example, by means of pumps not illustrated here.

The conduit 7 is thermally coupled to a heat exchanger 3 in order to transfer thermal energy between the heat-transfer fluid 6 in the conduit 7 and another fluid in a separate conduit 4. The heat exchanger 3 can be utilized in particular for the extraction of heat from the heat store 1 so that the fluid in the conduit 4 is heated and can be employed, for example, for supplying a building or hot-water heating system. By means of a configuration as a high-temperature heat store, the heated fluid in the conduit 4 is also suitable for generating electrical energy. The introduction of thermal energy can also occur with a heat exchanger which, like the illustrated heat exchanger 3, is thermally coupled to the conduit 7. In the illustrated example, however, electric heating elements 20 are provided instead, which utilize electrical energy for the heating of the heat-transfer fluid 6.

In contrast to conventional heat stores, a plurality of rails 11 are used as heat-storage bodies 10, which in the illustrated example are train track rails. The rails 11 are stacked in layers 12A-12D one on top of the other. A plurality of rails 11 can be arranged substantially parallel to one another so as to form respective layers 12A, 12B, 12C or 12D which extend horizontally. The rails 11 of directly adjacent layers, for example of layers 12A and 12B, are arranged transversely relative to one another. In the illustrated example, the rails 11 of different layers are arranged so as to be perpendicular to one another although other angles are also possible. A rail 11 thus rests on a plurality of, for example at least five or at least ten, rails 11 underneath it. Formed between the rails 11 are empty spaces 19 through which the heat-transfer fluid 6 flows. The empty spaces 19 thus form channels along the longitudinal direction of the rails 11.

The rails 11 can have a uniform cross-section, as shown in FIG. 2, along their length. In cross-section, a rail 11 consists of two wider ends 13 and 14 joined to one another by a web 12 that is narrower by comparison. The cited sections can be manufactured as a single piece or at least from the same material. The wider end 14 constitutes a base 16 while the wider end 13 forms a rail head 15. The base 16 has a flat bottom side, which contributes to a reliable footing. A width of the base 16 or its bottom side is also greater than a width of the web 12 and greater than a width of the rail head 15. Width is to be understood in a direction perpendicular to the longitudinal axis of the rail 11 and perpendicular to the direction in which the rail head 15 and the base 16 are joined. The surface area of the bottom side of the base 16 is thus defined by the width and length of the latter.

The rail head 15 has a relatively large mass and thus enables the storage of large amounts of thermal energy. A surface area and thus a heat exchange of the rail 11 is simultaneously considerably greater than in the case of, e.g., a rectangular bar of the same length and cross-sectional area. As the width of the rail head 15 is smaller than the width of the base 16, the bottom side of a further rail arranged on the rail head 15 remains accessible. This permits a better exchange of thermal energy than in cases of a symmetrical double-T-beam cross-section which, instead of a rail head, has a shape identical to that of the base. Moreover, the surface over which the rails 11 can exchange thermal energy with a heat-transfer fluid is further increased when at least an upper side of the rail head 15 is rounded, as this reduces the contact surface area with an adjacent rail.

While FIG. 1 shows an arrangement of rails 11 in which the longitudinal directions of all rails 11 extend in a horizontal plane and the rails 11 are stacked on top of one another, many of the described effects and advantages are also achieved with variants in which the rails 11 stand upright so that their longitudinal axes extend in a vertical direction. The vertically arranged rails 11 can optionally stand on a perforated plate so as to facilitate a continuous flow of heat-transfer fluid along their longitudinal axes. A further possible arrangement of rails 11 is described in the following with reference to FIG. 3.

Figure 3:
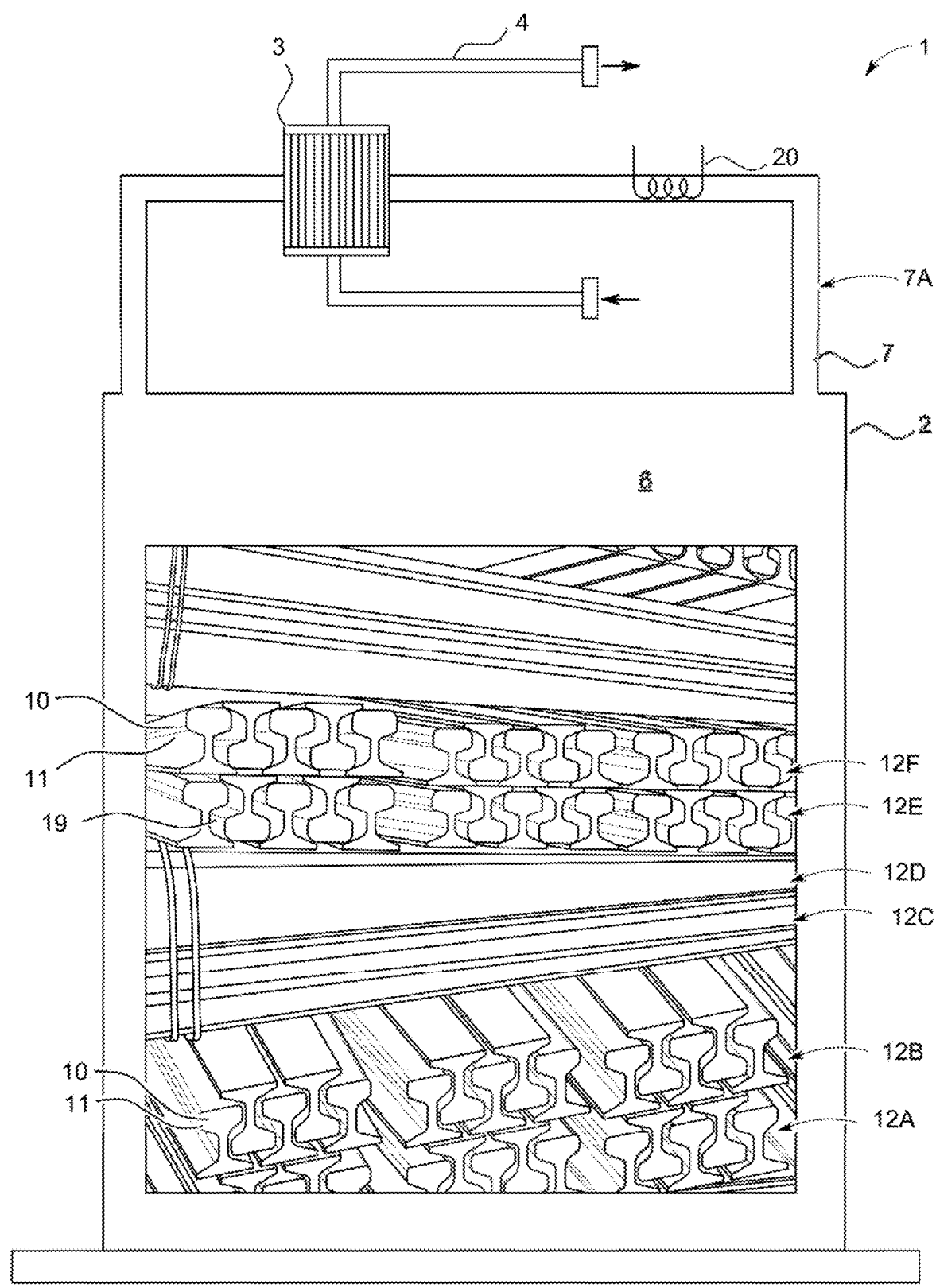
FIG. 3 is a schematic illustration of a further example embodiment of a heat store of the invention.

Example Embodiment of FIG. 3

FIG. 3 shows schematically a further variant embodiment of a heat store 1 according to the invention. This variant differs from the embodiment example described above in the arrangement of the rails 11. These are once again railway rails arranged with their longitudinal axes in a horizontal direction. Within a layer (i.e. of the same height), however, the base 16 and the rail head 13 alternately point downwards. A rail 11 standing on its head is thus arranged between two rails 11 standing on their bases 16. This decreases the volume between the rails 11 in principle available for a heat-transfer fluid. At the same time, the accessible surface of the rails 11 remains essentially the same as in the example shown in FIG. 1 (with the same number or mass of rails). Depending on the heat-transfer fluid employed and the desired flow characteristics, the design shown in FIG. 1 or FIG. 3 can be more suitable.

FIG. 3 also illustrates that, in cases where rails 11 are stacked, each tier or layer 12A-12F does not have to be oriented transversely or perpendicularly to the adjacent tiers. Instead, the longitudinal axes of two rails 11 arranged one above the other are essentially parallel here, e.g. in the layers 12A and 12B. The next rail 11 (of the layer 12C) arranged thereon runs perpendicularly to the two rails 11 underneath it. FIG. 3 further illustrates by way of example that optional fastenings, such as metal chains, can be used to respectively hold some of the rails in position or to facilitate the transport of the rails during the assembly of the heat store.

Figure 4:
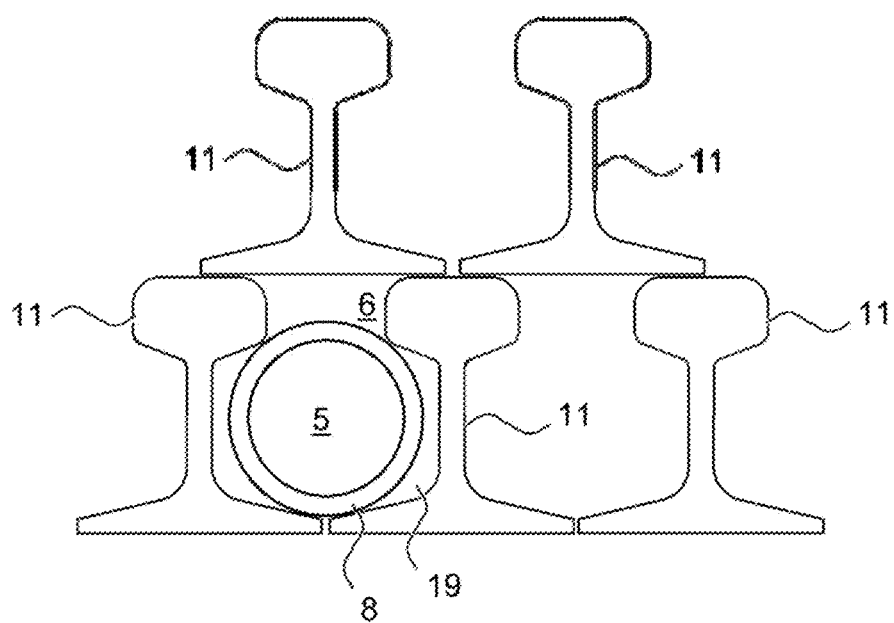
FIG. 4 is a schematic cross-sectional view of an arrangement of rails in an example embodiment of a heat store of the invention.

Example Embodiment of FIG. 4

FIG. 4 shows an alternative arrangement of rails 11 that can be employed in the example embodiments of FIG. 1 or 2. A heat-transfer fluid is once again received in free spaces or empty spaces 19 formed between adjacent rails 11. Moreover, a pipe conduit 8 through which a further heat-transfer fluid 5 is conducted runs through at least some of the empty spaces 19. One of the two heat-transfer fluids 5 and 6 can be utilized to introduce heat into the heat store while the other of the two heat-transfer fluids 5 and 6 serves to extract heat from the heat store.

The described example embodiments are purely illustrative and variants of the same within the scope of the attached claims are possible. For example, the design of the conduit 7 for heat-transfer fluid can be modified so that the conduit 7 also extends through the housing 2 or extends exclusively in the housing 2 and/or so that, instead of a closed circuit 7A being formed with the conduit 7, there is instead merely a supply and removal of heat-transfer fluid 6 to/from the rails 11. In general, the description of an element is to be understood to mean "at least one" such element. For example, it is also possible for a plurality of conduits 7 to be provided in order to conduct heat-transfer fluid either partially separately or completely separately to different rails 11 in the housing 2. This allows rails 11 to be heated to different temperatures or there can occur a selection of which rails to extract heat from, which can potentially increase the energy conversion efficiency of the thermal energy usage. The drawings are also to be understood as schematic principles that can be supplemented with further components, e.g., pumps, fans, flow baffles, thermal insulation, pressure-relief conduits, temperature and pressure sensors or further heat-storage bodies besides the described rails.

LIST OF REFERENCE SIGNS

1 Heat store
2 Housing
3 Heat exchanger
4 Separate conduit/separate fluid circuit
5 Heat-transfer fluid
6 Heat-transfer fluid
7 Conduit for heat-transfer fluid
7A Circuit for heat-transfer fluid
8 Pipe conduit for a heat-transfer fluid
10 Heat-storage body
11 Rail
12A-12F Layers of rails 11
12 Web
13, 14 Wider ends
15 Rail head
16 Base
19 Empty spaces between the rails 11
20 Electric heating elements

What is claimed is:
1. A heat store comprising:
heat-storage bodies for storing thermal energy;
a housing in which the heat-storage bodies are received; and
at least one conduit for a heat-transfer fluid in order to conduct thermal energy to and/or away from the heat-storage bodies;
wherein each of the heat-storage bodies includes a metallic rail with an elongated shape, a cross-section of which comprises a web between wider ends, and
wherein in cross-section one of the wider ends forms a base and another of the wider ends forms a rail head which is directly joined to the web and which has a width that is greater than a width of the web and smaller than a width of the base.
2. The heat store according to claim 1,
wherein the base has a flat bottom.
3. The heat store according to claim 1,
wherein a mass of the rail head is at least 40% of a total mass of the rail.

4. The heat store according to claim 1,
wherein all rails stand on their respective bases or wherein adjacent rails stand alternately on their base or on their rail head.

5. The heat store according to claim 1,
wherein the heat-transfer fluid is received in empty spaces formed between the bases, rail heads and webs of respectively adjacent rails.

6. The heat store according to claim 1,
wherein the rails are formed by railway rails.

7. The heat store according to claim 1,
wherein the rails are stacked on top of one another in the housing in a plurality of layers.

8. The heat store according to claim 7,
wherein the rails of the same layer are arranged parallel to one another and the rails of an adjacent layer are arranged transversely thereto.

9. The heat store according to claim 7,
wherein all rails stand on their respective bases or wherein adjacent rails stand alternately on their base or on their rail head.

10. The heat store according to claim 7,
wherein the heat-transfer fluid is received in empty spaces formed between the bases, rail heads and webs of respectively adjacent rails.

11. The heat store according to claim 1,
wherein two separately conducted heat-transfer fluids are provided for conducting heat to the heat-storage bodies and for conducting heat away from the heat-storage bodies,
wherein one of the heat-transfer fluids is conducted in pipe conduits between the rails, and
wherein the other heat-transfer fluid is either conducted freely along the rails or in other pipe conduits between the rails.

12. The heat store according to claim 1,
wherein electric heating elements are arranged between adjacent rails or in a circuit of the heat-transfer fluid.

13. A method for operating a heat store,
in which heat-storage bodies for storing thermal energy are received in a housing,
wherein thermal energy is conducted to the heat-storage bodies and/or away from the heat-storage bodies with a heat-transfer fluid,
wherein each of the heat-storage bodies includes a metallic rail with an elongated shape, a cross-section of which comprises a web between wider ends,
wherein two separately conducted heat-transfer fluids are provided for conducting heat to the heat-storage bodies and for conducting heat away from the heat-storage bodies,
wherein one of the heat-transfer fluids is conducted in pipe conduits between the rails, and
wherein the other heat-transfer fluid is either conducted freely along the rails or in other pipe conduits between the rails.

14. The method according to claim 13,
wherein the rails are stacked on top of one another in the housing in a plurality of layers.

15. The method according to claim 13,
wherein the rails are formed by railway rails.

16. A heat store comprising:
heat-storage bodies for storing thermal energy;
a housing in which the heat-storage bodies are received; and
at least one conduit for a heat-transfer fluid in order to conduct thermal energy to and/or away from the heat-storage bodies;
wherein each of the heat-storage bodies includes a metallic rail with an elongated shape, a cross-section of which comprises a web between wider ends, and
wherein the rails are stacked on top of one another in the housing in a plurality of layers.

17. The heat store according to claim 16,
wherein the rails are formed by railway rails.

18. The heat store according to claim 16,
wherein the rails of the same layer are arranged parallel to one another and the rails of an adjacent layer are arranged transversely thereto.

19. The heat store according to claim 16,
wherein all rails stand on their respective bases or wherein adjacent rails stand alternately on their base or on their rail head.

20. The heat store according to claim 16,
wherein the heat-transfer fluid is received in empty spaces formed between the bases, rail heads and webs of respectively adjacent rails.

* * * * *